Patented June 2, 1931

1,808,271

UNITED STATES PATENT OFFICE

OTTO von KEUSSLER AND DANIEL PETERS, OF DARMSTADT, GERMANY

PROCESS FOR DEHYDRATING ALCOHOL

No Drawing. Application filed April 10, 1928, Serial No. 269,020, and in Germany May 6, 1927.

The technical manufacture of waterfree alcohol by the action of quicklime on aqueous alcohol is the following:

The quicklime is added to the aqueous alcohol in more or less large pieces. After the dehydration the alcohol is distilled off. A noticeable amount of the alcohol is kept back by the quicklime forming a hard mass and cannot be recuperated directly. In order to recuperate this part of the alcohol, water is added to the quicklime and the aqueous alcohol of the such obtained suspension is distilled off. The quicklime freed of alcohol remains as a thin paste and forms a residue which cannot be used.

The same drawbacks occur in the same manner in the process of dehydrating alcohol by heating it with quicklime under pressure.

It is self-understood that the addition of water to the paste of alcohol-quicklime and the following distillation of the mixture means as well an increased consumption of vapour as an increased loss of alcohol. It has now been established that by another method of working vapour may be saved materially whilst simultaneously decreasing the loss of alcohol. Instead of adding water to the quicklime and distilling the alcohol-water mixture, the quicklime is subjected to a vacuum distillation, and thereby the last part of the alcohol is obtained therefrom. The consumption of vapour thereby is decreased for each 100 ltrs. of produced absolute alcohol for 70 kgs., whilst the loss of alcohol simultaneously is decreased from 6 to 2%.

The result of this process is still improved by using instead of the generally used pieces of quicklime, quicklime as a powder; a further advantage may be obtained by strongly stirring the quicklime paste during the vacuum-treatment. Up to now the stirring-means were not agitated during the operation of recuperating the last part of the alcohol.

Still better results are obtained by combining the method of the present invention with the dehydration of alcohol by heating it with quicklime under pressure. Finally, the best result will be obtained by using quicklime in powder-form, working under pressure, subjecting to a vacuum distillation the hardened quicklime (and thereby recuperating the last parts of alcohol) whilst strongly agitating the mixture.

An example of dehydrating alcohol in accordance with my improved process is as follows:

To 100 liters of aqueous spirit (94% vol., 96% weight) 25 kgs. quickline (with nearly 100% CaO) are added and heated to a pressure of 2.5 atmospheres (corresponding to a temperature of 116° C.) for one hour in a closed vessel. After this the alcohol of 99.9% is distilled off through a condenser, while the quicklime remains in the vessel as a hardened paste of quicklime and alcohol. This paste still contains a considerable amount of alcohol. In order to recuperate this alcohol the hardened paste of a weight of about 33 kgs. is subjected to a vacuum distillation, the vacuum being about 600 mm. The temperature during this vacuum distillation amounts to about 80° C.; it is pointed out that this high temperature is due to the fact that the quicklime is superheated, while the temperature of alcohol vapors which corresponds to a vacuum of 600 mm. would only be about 30° C.

Claims:

1. Process for dehydrating aqueous alcohol which consists in heating the aqueous alcohol with quicklime, distilling off the formed anhydrous alcohol and recuperating the last part of the waterfree alcohol retained by the hardened quicklime by subjecting the quicklime to a vacuum distillation.

2. Process for dehydrating aqueous alcohol which consists in heating the aqueous spirit with quicklime, distilling off the formed anhydrous alcohol and recuperating the last part of the waterfree alcohol retained by the hardened quicklime by subjecting the quicklime to a vacuum distillation while strongly agitating the mixture.

3. Process for dehydrating aqueous alcohol which consists in heating the aqueous alcohol with quicklime in powder form, distilling off the formed anhydrous alcohol and recuperating the last part of the waterfree alcohol retained by the hardened quicklime by subjecting the quicklime to a vacuum distillation, while strongly agitating the mixture.

4. Process of dehydrating aqueous alcohol which consists in heating the aqueous spirit with quicklime under super-atmospheric pressure, distilling off the formed anhydrous alcohol and recuperating the last part of the waterfree alcohol retained by the hardened quicklime by subjecting the quicklime to a vacuum distillation.

5. Process of dehydrating aqueous alcohol which consists in heating the aqueous spirit with quicklime under superatmospheric pressure, distilling off the formed anhydrous alcohol and recuperating the last part of the waterfree alcohol retained by the hardened quicklime by subjecting the quicklime to a vacuum distillation, while strongly agitating the mixture.

6. Process for dehydrating aqueous alcohol which consists in heating the aqueous spirit with quicklime in powder form under superatmospheric pressure, distilling off the formed anhydrous alcohol and recuperating the last part of the waterfree alcohol retained by the hardened quicklime by subjecting the quicklime to a vacuum distillation while strongly agitating the mixture.

In testimony whereof we have hereunto signed our names.

Dr. DANIEL PETERS.
Dr. OTTO v. KEUSSLER.